United States Patent
Chen

(10) Patent No.: US 11,686,317 B2
(45) Date of Patent: Jun. 27, 2023

(54) LONG-DISTANCE SPEED CONTROL SYSTEM FOR BRUSHLESS DC MOTOR OF FAN

(71) Applicant: AIR COOL INDUSTRIAL CO., LTD., Taichung (TW)

(72) Inventor: Shih-Ming Chen, Taichung (TW)

(73) Assignee: AIR COOL INDUSTRIAL CO., LTD., Taichung (TW)

( * ) Notice: Subject to any disclaimer, the term of this patent is extended or adjusted under 35 U.S.C. 154(b) by 174 days.

(21) Appl. No.: 17/372,178

(22) Filed: Jul. 9, 2021

(65) Prior Publication Data

US 2023/0011313 A1    Jan. 12, 2023

(51) Int. Cl.
| | |
|---|---|
| F04D 27/00 | (2006.01) |
| F04D 25/08 | (2006.01) |
| H02K 11/33 | (2016.01) |
| H02K 7/14 | (2006.01) |
| H02K 11/26 | (2016.01) |
| H02P 7/03 | (2016.01) |

(52) U.S. Cl.
CPC ......... *F04D 27/004* (2013.01); *F04D 25/088* (2013.01); *H02K 7/14* (2013.01); *H02K 11/26* (2016.01); *H02K 11/33* (2016.01); *H02P 7/05* (2016.02)

(58) Field of Classification Search
CPC ..... F04D 27/004; F04D 25/088; H02K 11/33; H02P 7/05
See application file for complete search history.

(56) References Cited

U.S. PATENT DOCUMENTS

| | | | | |
|---|---|---|---|---|
| 5,738,496 A | * | 4/1998 | Mehta | F04D 25/088 |
| | | | | 417/572 |
| 10,469,001 B1 | * | 11/2019 | Liao | F04D 27/004 |
| 2008/0169732 A1 | * | 7/2008 | Chang | H02K 11/33 |
| | | | | 310/67 R |
| 2016/0079882 A1 | * | 3/2016 | Enomoto | A45D 20/08 |
| | | | | 363/126 |
| 2020/0340487 A1 | * | 10/2020 | Register | F04D 29/005 |
| 2021/0239125 A1 | * | 8/2021 | Tetreault | F04D 25/088 |

* cited by examiner

*Primary Examiner* — Kawing Chan
(74) *Attorney, Agent, or Firm* — Pai Patent & Trademark Law Firm; Chao-Chang David Pai

(57) ABSTRACT

A long-distance speed control system for a brushless DC motor of a fan is provided. The long-distance speed control system includes a switch connected with a mains power supply, a switch circuit, a voltage detection module, a power cord, a processing unit, and a drive unit, which can control the multi-stage rotational speed of the motor. In the field of brushless DC motors for fans, there is no need to use analog-to-digital conversion chips between the mains power supply and the processor, having the advantages of low cost, environmental protection, and reduction of waste of earth resources. Besides, the switch, the switch circuit and the power cord can withstand the mains power supply, having the advantages of less signal attenuation and long-distance transmission.

8 Claims, 2 Drawing Sheets

LONG-DISTANCE SPEED CONTROL SYSTEM FOR BRUSHLESS DC MOTOR OF FAN

FIELD OF THE INVENTION

The present invention relates to a ceiling fan, and more particularly to a long-distance speed control system for a brushless DC motor of a fan.

BACKGROUND OF THE INVENTION

In the technical field of a brushless DC motor for a fan, the fan has a brushless DC motor, a processor, a driver, and a speed control switching device. The speed control switching device is electrically connected to a mains AC power supply. The speed control switching device has an analog-to-digital conversion chip for processing AC power analog signals and speed switching control digital signals, so that the speed control switching device outputs digital signals to the processor. The driver is controlled by the processor to drive the brushless DC motor to run.

However, for the fans using brushless DC motors, the speed control switching device uses analog-digital conversion chips to process AC power and speed switching control. This has the disadvantages of increasing the manufacturing cost by more than 50%, and the manufacturing process of the chip is time-consuming. The popularity of fans is high in the world. Installing the analog-digital conversion chips to the fans leads to the disadvantage of a waste of earth resources. In addition, the speed control switching device and the processor are connected by a low-voltage digital transmission wire. The signal attenuation is more serious than that of the mains AC power cord, and long-distance transmission is impossible. Accordingly, the inventor of the present invention has devoted himself based on his many years of practical experiences to solve these problems.

SUMMARY OF THE INVENTION

The primary object of the present invention is to provide a long-distance speed control system for a brushless DC motor of a fan, having the advantages of multi-stage speed control, long-distance transmission, low cost, environmental protection, and reduction of waste of earth resources.

In order to achieve the aforesaid object, a long-distance speed control system for a brushless DC motor of a fan is provided. The fan has a motor. The motor is a brushless DC motor. The long-distance speed control system comprises a mains power supply, a switch, a switch circuit, a voltage detection module, a processing unit, and a drive unit. The mains power supply is an AC (alternating-current) power supply and configured to output a first power signal. The switch is electrically connected to the mains power supply to receive and transmit the first power signal. The switch has a plurality of variable speed positions for controlling a rotational speed of the motor. The speed positions are defined as a highest speed position, a plurality of speed control positions and an off position according to the rotational speed of the motor from high to low and stop, respectively. The switch circuit has a plurality of components and a first node. The components each have an input terminal and an output terminal. The speed positions of the switch are selectively, electrically connected to the input terminals of the components. The output terminals of the components are electrically connected to the first node. The components of the switch circuit respectively receive the first power signal to output a switching signal. The components are defined as a first wire and a plurality of capacitor banks, respectively. The highest speed position of the switch corresponds to the first wire. The speed control positions of the switch correspond to the capacitor banks, respectively. The speed control positions of the switch, arranged according to the rotational speed of the motor from high to low, correspond to the capacitor banks arranged in descending order of capacitance, respectively. The capacitor banks each have at least one capacitor. The capacitance of each capacitor bank is different. The first power signal is not adjusted through the first power signal passing through the first wire of the components, or a voltage of the first power signal is reduced through the first power signal passing through the capacitor banks of the components for the switch circuit to output the switching signal. The voltage detection module is electrically connected to the first node of the switch circuit for the voltage detection module to receive the switching signal. The voltage detection module is configured to detect, judge and process the switching signal and to detect and judge a voltage of the switching signal for outputting a voltage detection signal. The voltage detection module further outputs a second power signal. The processing unit is electrically connected to the voltage detection module. The processing unit receives the voltage detection signal. The processing unit outputs a speed control signal according to the voltage detection signal. The drive unit is electrically connected to the processing unit, the voltage detection module, and the motor of the fan. The drive unit receives the speed control signal and the second power signal. The drive unit controls the motor of the fan to turn on, turn off, and regulate the rotational speed according to the speed control signal and the second power signal.

The long-distance speed control system of the brushless DC motor of the fan provided by the present invention can control the multi-stage rotational speed of the motor through the switch, the switch circuit, the voltage detection module and the processing unit. In the field of brushless DC motors for fans, there is no need to use analog-to-digital conversion chips between the mains power supply and the processor, having the advantages of low cost, environmental protection, and reduction of waste of earth resources. Besides, the switch, the switch circuit and the power cord can withstand the mains power supply, having the advantages of less signal attenuation and long-distance transmission.

DETAILED DESCRIPTION OF THE PREFERRED EMBODIMENTS

Embodiments of the present invention will now be described, by way of example only, with reference to the accompanying drawings.

Figure 1:
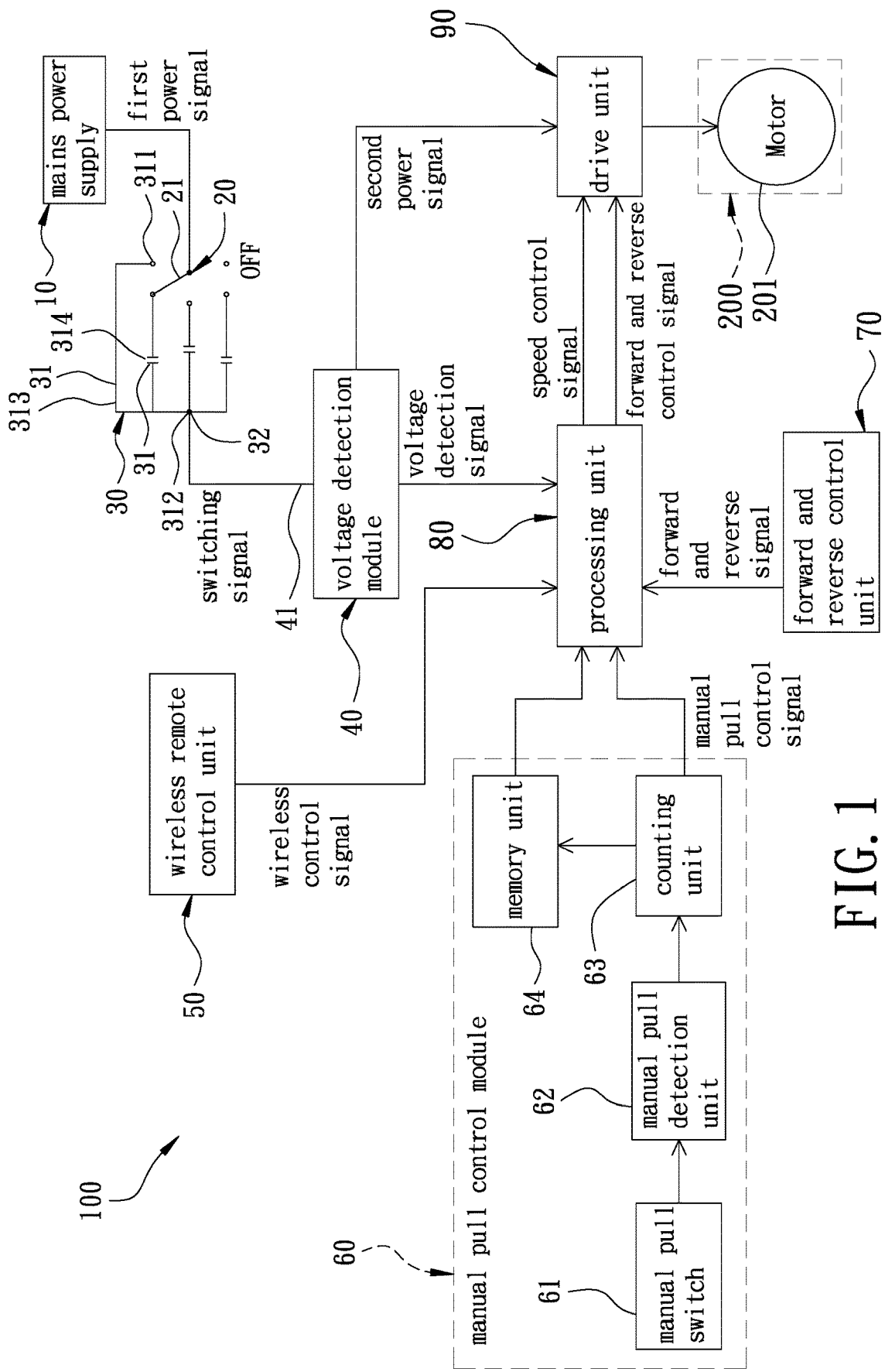
FIG. 1 is a block diagram a preferred embodiment of the present invention.
Figure 2:
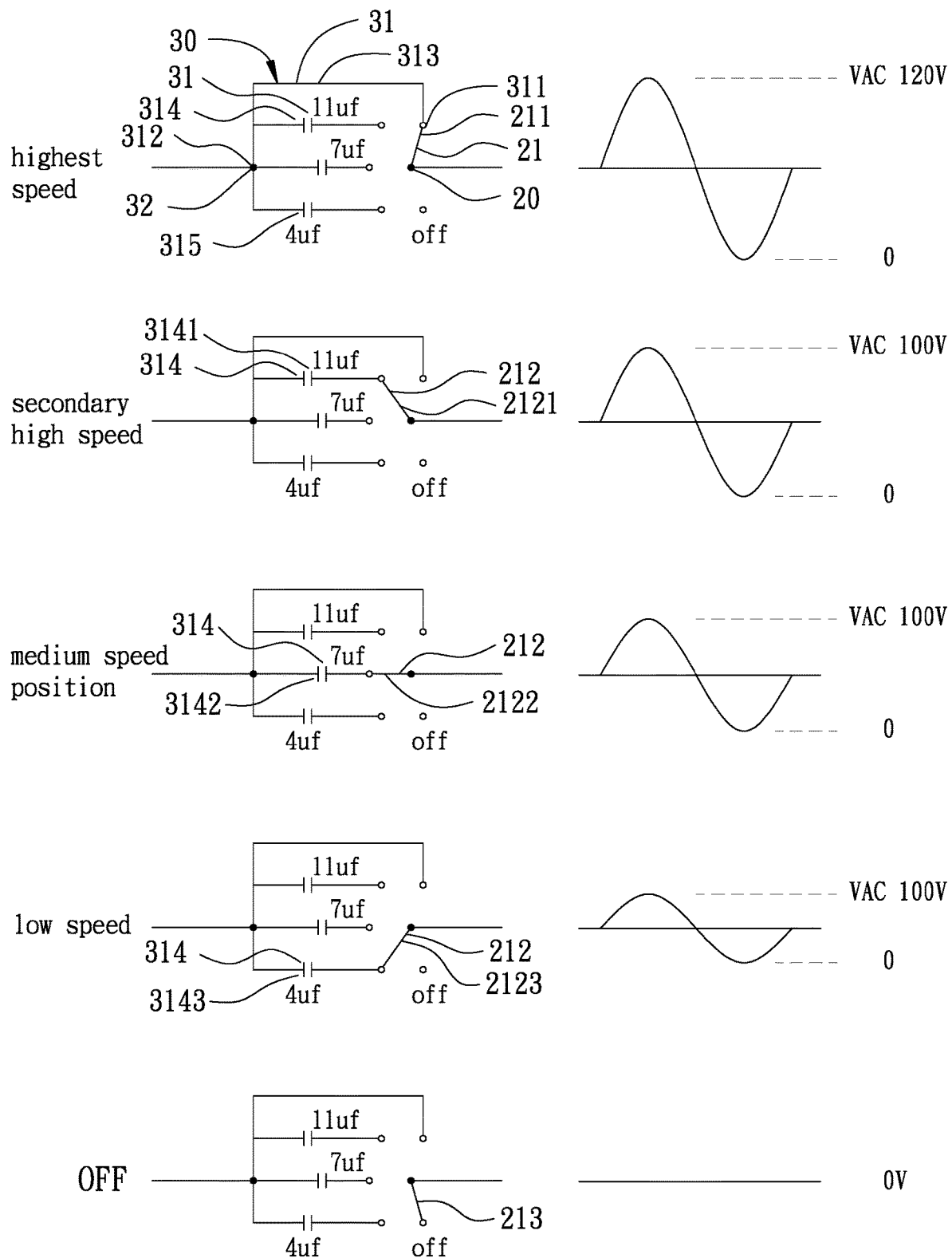
FIG. 2 is a schematic diagram of the switch circuit and the waveform state of the switching signal of the preferred embodiment of the present invention, showing the waveform of the first power signal passing through the components of the switch circuit.

FIG. 1 is a block diagram a preferred embodiment of the present invention. FIG. 2 is a schematic diagram, showing the waveform state. The present invention discloses a long-distance speed control system 100 for a brushless DC motor, applied to a fan 200. The fan 200 is a ceiling fan. The fan 200 has a motor 201. The motor 201 is a brushless DC motor. The long-distance speed control system 100 comprises a mains power supply 10, a switch 20, a switch circuit 30, a voltage detection module 40, a wireless remote control unit 50, a manual pull control module 60, a forward and reverse control unit 70, a processing unit 80, and a drive unit 90.

The mains power supply 10 is an AC (alternating-current) power supply and outputs a first power signal. The first power signal is an AC power signal.

The switch 20 is electrically connected to the mains power supply 10 to receive and transmit the first power signal. The switch 20 has a plurality of variable speed positions 21 for controlling the rotational speed of the motor 201. The speed positions 21 are defined as a highest speed position 211, a plurality of speed control positions 212 and an off position 213 according to the rotational speed of the motor 201 from high to low and stop, respectively. The speed control positions 212 of the switch 20 are defined as a secondary high speed position 2121, a medium speed position 2122 and a low speed position 2123 according to the rotational speed of the motor 201 from high to low. The off position 213 is used to stop the motor 201 from running.

The switch circuit 30 has a plurality of components 31 and a first node 32. The components 31 each have an input terminal 311 and an output terminal 312. The speed positions 21 of the switch 20 are selectively electrically connected to the input terminals 311 of the components 31. The output terminals 312 of the components 31 are electrically connected to the first node 32. The components 31 of the switch circuit 30 respectively receive the first power signal to output a switching signal. The components 31 are defined as a first wire 313 and a plurality of capacitor banks 314, respectively. The capacitor banks 314 are respectively defined as a first capacitor bank 3141, a second capacitor bank 3142 and a third capacitor bank 3143 arranged in descending order of capacitance. The highest speed position 211 of the switch 20 corresponds to the first wire 313. The speed control positions 212 of the switch 20 correspond to the capacitor banks 314, respectively. The speed control positions 212 of the switch 20, arranged according to the rotational speed of the motor 201 from high to low, correspond to the capacitor banks 314 arranged in descending order of capacitance, respectively. Each capacitor bank 314 has at least one capacitor 315. The capacitance of each capacitor bank 314 is different. Thereby, the speed positions 21 of the switch 20 are selectively, electrically connected to the first wire 313 and the input terminals 311 of the capacitor banks 314, so that the first power signal is not adjusted through the first power signal passing through the first wire 313 of the components 31 or the voltage of the first power signal is reduced through the first power signal passing through the capacitor banks 314 of the components 31 for the switch circuit 30 to output the switching signal. FIG. 2 is a schematic diagram of the switch circuit 30 and the waveform state of the switching signal of the preferred embodiment of the present invention, showing the waveform of the first power signal passing through the components 31 of the switch circuit 30.

The voltage detection module 40 is electrically connected to the first node 32 of the switch circuit 30 through a power cord 41 for the voltage detection module 40 to receive the switching signal. The switch 20, the switch circuit 30 and the power cord 41 can withstand the mains power supply 10. Since the mains power supply 10 supplies high-voltage power, the power cord 41 has the advantages of less signal attenuation and long-distance transmission compared with ordinary digital connecting wires. The voltage detection module 40 is configured to detect, judge and process the switching signal and to detect and judge the voltage of the switching signal for outputting a voltage detection signal. The voltage detection module 40 further outputs a second power signal. The second power signal is an AC power signal. The switching signal, the voltage of the switching signal and the voltage detection signal have a corresponding relationship with the components 31 of the switch circuit 30 and the speed control positions 212.

The wireless remote control unit 50 is configured to output a wireless control signal.

The manual pull control module 60 is configured to output a manual pull control signal. The manual pull control module 60 includes a manual pull switch 61, a manual pull detection unit 62, a counting unit 63, and a memory unit 64. The manual pull control module 60 outputs the manual pull control signal according to the output results of the manual pull switch 61, the manual pull detection unit 62, the counting unit 63, and the memory unit 64. The manual pull detection unit 62 is electrically connected to the counting unit 63 and the manual pull switch 61. The counting unit 63 is electrically connected to the memory unit 64.

The forward and reverse control unit 70 is configured to output a forward and reverse signal.

The processing unit 80 is electrically connected to the voltage detection module 40 and the forward and reverse control unit 70. The processing unit 80 is further in signal communication with the wireless remote control unit 50 and the manual pull control module 60. The processing unit 80 is further electrically connected to the memory unit 64 and the counting unit 63. The processing unit 80 receives the voltage detection signal, the wireless control signal, and the manual pull control signal. The processing unit 80 outputs a speed control signal according to one of the voltage detection signal, the wireless control signal and the manual pull control signal. In addition, the processing unit 80 receives the forward and reverse signal to output a forward and reverse control signal.

The drive unit 90 is electrically connected to the processing unit 80, the voltage detection module 40, and the motor 201 of the fan 200. The drive unit 90 receives the speed control signal and the second power signal. The drive unit 90 controls the motor 201 of the fan 200 to turn on, turn off, and regulate the rotational speed according to the speed control signal and the second power signal. Besides, the drive unit 90 receives the forward and reverse control signal to control the motor 201 of the fan 200 to change its rotational direction.

The long-distance speed control system 100 of the brushless DC motor of the fan provided by the present invention can control the multi-stage rotational speed of the motor through the switch 20, the switch circuit 30, the voltage detection module 40 and the processing unit 80. In the field of brushless DC motors for fans, there is no need to use analog-to-digital conversion chips between the mains power supply 10 and the processor, having the advantages of low cost, environmental protection, and reduction of waste of earth resources. Besides, the switch 20, the switch circuit 30 and the power cord 41 can withstand the mains power supply 10, having the advantages of less signal attenuation and long-distance transmission.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A long-distance speed control system for a brushless DC (direct current) motor of a fan, the fan having a motor, the motor being a brushless DC motor, the long-distance speed control system comprising:

a mains power supply, being an AC (alternating-current) power supply and outputting a first power signal;

a switch, electrically connected to the mains power supply to receive and transmit the first power signal, the switch having a plurality of variable speed positions for controlling a rotational speed of the motor, the speed positions being defined as a highest speed position, a plurality of speed control positions and an off position according to the rotational speed of the motor from high to low and stop, respectively;

a switch circuit, having a plurality of components and a first node, the components each having an input terminal and an output terminal, the speed positions of the switch being selectively, electrically connected to the input terminals of the components, the output terminals of the components being electrically connected to the first node, the components of the switch circuit respectively receiving the first power signal to output a switching signal, the components being defined as a first wire and a plurality of capacitor banks respectively, the highest speed position of the switch corresponding to the first wire, the speed control positions of the switch corresponding to the capacitor banks respectively, the speed control positions of the switch, arranged according to the rotational speed of the motor from high to low corresponding to the capacitor banks arranged in descending order of capacitance respectively, the capacitor banks each having at least one capacitor, the capacitance of each capacitor bank being different, the first power signal being not adjusted through the first power signal passing through the first wire of the components or a voltage of the first power signal being reduced through the first power signal passing through the capacitor banks of the components for the switch circuit to output the switching signal;

a voltage detection module, electrically connected to the first node of the switch circuit for the voltage detection module to receive the switching signal, the voltage detection module being configured to detect, judge and process the switching signal and to detect and judge a voltage of the switching signal for outputting a voltage detection signal, the voltage detection module further outputting a second power signal;

a processing unit, electrically connected to the voltage detection module, the processing unit being receiving the voltage detection signal, the processing unit outputting a speed control signal according to the voltage detection signal;

a drive unit, electrically connected to the processing unit, the voltage detection module and the motor of the fan, the drive unit receiving the speed control signal and the second power signal, the drive unit controlling the motor of the fan to turn on, turn off, and regulate the rotational speed according to the speed control signal and the second power signal.

2. The long-distance speed control system as claimed in claim 1, wherein the voltage detection module is electrically connected to the first node of the switch circuit through a power cord, and the switch, the switch circuit and the power cord are able to withstand the mains power supply.

3. The long-distance speed control system as claimed in claim 2, further comprising a wireless remote control unit and a manual pull control module, wherein the wireless remote control unit is configured to output a wireless control signal, the manual pull control module is configured to output a manual pull control signal, the processing unit is in signal communication with the wireless remote control unit and the manual pull control module, the processing unit receives the voltage detection signal, the wireless control signal and the manual pull control signal, and the processing unit outputs the speed control signal according to one of the voltage detection signal, the wireless control signal and the manual pull control signal.

4. The long-distance speed control system as claimed in claim 3, wherein the manual pull control module includes a manual pull switch, a manual pull detection unit, a counting unit and a memory unit, and the manual pull control module outputs the manual pull control signal according to output results of the manual pull switch, the manual pull detection unit, the counting unit and the memory unit.

5. The long-distance speed control system as claimed in claim 4, wherein the manual pull detection unit is electrically connected to the counting unit and the manual pull switch, the counting unit is electrically connected to the memory unit, and the processing unit is further electrically connected to the memory unit and the counting unit.

6. The long-distance speed control system as claimed in claim 5, further comprising a forward and reverse control unit to output a forward and reverse signal, wherein the processing unit is further electrically connected to the forward and reverse control unit, the processing unit receives the forward and reverse signal to output a forward and reverse control signal, the drive unit receives the forward and reverse control signal to control the motor of the fan to change its rotational direction.

7. The long-distance speed control system as claimed in claim 1, wherein the first power signal is an AC power signal, and the second power signal is an AC power signal.

8. The long-distance speed control system as claimed in claim 1, wherein the fan is a ceiling fan.

* * * * *